Patented June 24, 1947

2,422,709

UNITED STATES PATENT OFFICE 2,422,709

REFRIGERANT AND METHOD OF MAKING

Sol B. Wiczer, Washington, D. C.

No Drawing. Application June 1, 1945,
Serial No. 597,163

5 Claims. (Cl. 252—67)

The present invention relates to an improvement of water ice as a refrigerant and method of making the same. This application is a continuation in part of my co-pending application 442,236 filed May 8, 1942, emphasizing the salient features disclosed therein. It is known in the art to hydrate Dry Ice by addition of small proportions of moisture to the liquefied gas during evaporation thereof.

It is also known to use a combination of Dry Ice and water ice as a refrigerant whereby discrete portions of Dry Ice are associated with water ice such as by using proportionately large blocks of Dry Ice placed on top of a layer of ordinary water ice and even to drill holes in a block of ordinary ice and fill the same with Dry Ice so that such product would consist of ordinary water ice blocks having inserted therein several discrete tubes or holes filled with pure Dry Ice.

It is also known to add ordinary salts to ice to form an ice salt mixture whereby the ice absorbs some salt forming a salt solution having a freezing point lower than water in proportion to the salt content.

According to the present invention a substantially homogeneous mixture of water ice in major proportions and carbon dioxide ice in minor proportions is formed by intimately associating the two ices such as by grinding the two different ices together using a major proportion of ordinary water ice and a minor proportion preferably 10% or less of Dry Ice. But it will be understood that a significant proportion of carbon dioxide at least 0.1% is always used; such proportions being understood to be critically sufficient to provide Dry Ice to be absorbed in the surface of ground water ice.

Carbon dioxide at normal temperatures is a gas which according to the standard physical chemical laws will dissolve in other substances such as liquids in direct proportion to the pressure exerted thereon. Also, according to standard physical chemical laws, the quantity that will dissolve is inversely proportional to the temperature and therefore will increase as the temperature is lowered.

One method of the present invention favors increased solution of the carbon dioxide in water ice according to both of these laws in that ordinary water ice is ground in the presence of a minor quantity of Dry Ice. Grinding involves exertion of disruptive pressure and attrition upon both ices. Such pressure on ordinary ice, while breaking the crystal structure into small fragments, would tend to liquefy and form a surface film thereon of liquid. Simultaneously applied disruptive pressure on the Dry Ice in such grinding operation would tend to form solid $CO_2$ particles and some $CO_2$ gas or liquid. Since both ices are simultaneously ground much of the $CO_2$ is absorbed by the ordinary ice forming a surface film of dissolved, absorbed or coated ordinary ice with the Dry Ice. The resultant product is essentially water ice supercooled by contact with Dry Ice and having a substantial $CO_2$ content absorbed and dissolved in the surface thereof to give an "ice-salt" effect of depressed melting point. Also if more Dry Ice is used than is absorbed, as is often the case in a commercial grinding or crushing operation, there will be present some unabsorbed free Dry Ice.

Ordinary Dry Ice associated but undissolved or unabsorbed in the water ice will exhibit its normal properties of melting and vaporizing at the extreme low temperature of $-112°$ F. and the water ice will thereafter give up its normal sensible heat rapidly warming to $-32°$ F. where it begins to melt giving up its heat of fusion.

However the solid $CO_2$ of the present invention which has been absorbed in the surface of the water ice will exhibit the properties therewith of an ice-salt mixture causing both the ice and $CO_2$ to melt together at an intermediate low temperature. Since $CO_2$ is normally gaseous, some of it will normally be evolved, evaporated or dissipated by the melting product and the concentration of $CO_2$ therein will be reduced, resulting in a progressively higher melting point of the remaining ice mixture. Thus the $CO_2$ absorbed water ice will melt over a range of melting points intermediate that of ordinary water ice and Dry Ice, and both ices have been caused thereby to give up some of their heats of fusion at an intermediate temperature which can be controlled by the quantity of Dry Ice absorbed by the ordinary ice and thus the bulk of the Dry Ice is caused to give up its refrigerating value at a temperature above its normal vaporizing temperature i. e., above $-112°$ F.

Thus it will be appreciated that it is a primary object to associate the ices so that an intermediate melting composition is obtained wherein both ices contribute refrigerating value. It is an object to practically absorb as much of the $CO_2$ ice in the water ice as possible and this will be in the range of 0.1 to 10% of the water ice. However, in a commercial grinding or crushing all of the Dry Ice will not be absorbed and some Dry Ice will remain, depending on the efficiency of the grinding or other method of association. The excess free Dry Ice, unabsorbed merely has the effect of ordinary Dry Ice tending to hold the temperature of the mixture down to the normal vaporizing temperature of pure Dry Ice for a period of time depending on how much is present.

For example, if water ice and Dry Ice were mixed so as to provide a considerable excess of Dry Ice in a ratio of 2/3 of water ice and 1/3 Dry Ice, by volume, the mixture would last 2¾ hours in a sawdust insulated box before the temperature begins to rise appreciably above —75° F.

Thus the invention will be understood to relate to ice containing a small amount of $CO_2$, usually less than 10% of the order of .1 to 10%. Quantities such as .1% to 2% are preferably used for ordinary refrigeration ice and .1 to 5% is preferred quantity range where the ice is to be used for carbonated beverages.

The product, therefore, is essentially ice super-cooled when made substantially below the normal freezing point and maintained as such for refrigerating purposes by a small content of solid or dissolved $CO_2$. It is ice, often abnormally cold, but otherwise useful as a refrigerant for most purposes for which ordinary ice is used except that it may be colder and will last longer.

The product is to be distinguished from solid $CO_2$ which normally may contain a small quantity of ice as impurity. Also it is distinguished from simple mixtures of solid $CO_2$ and ice wherein the said carbon dioxide is in greater proportions, which have not the utility of ordinary ice because they fume and maintain too drastic subfreezing conditions. Such refrigerants freeze foods which may be undesirable and useless in beverages.

The present refrigerant, containing less than 10% of $CO_2$ when associated with food, quickly chills the same and is itself warmed in the process to substantially the ordinary freezing temperature of water. Therefore, it lasts longer without drastically superfreezing the foods with which it comes in contact. For example, ice cream is solidified quickly therewith but not frozen so hard as to be unpalatable. Similarly, fruits, vegetables, milk, meats and fish are quickly chilled therewith but are not frozen as is usual with solid $CO_2$ or mixtures of solid $CO_2$ in great quantities with ice.

An ideal use for this type of ice, which may be used in the form of cracked ice, snow or cubes, is in beverages of the carbonated type. There is present in the ice a small quantity of $CO_2$ partially to carbonate the water so that ordinary water may be added to form carbonated water. It tends to overcome the disadvantage of ordinary ice which dilutes and weakens carbonated water. This disadvantage is so pronounced that ordinary ice is useless in some carbonated beverages because it dilutes and flattens it; for example, ordinary ice cannot be added to beer, ale or carbonated wines such as champagne. The ice of the present invention, when added to beverages, quickly chills the same and replaces the $CO_2$ normally lost in the ordinary addition of ice to carbonated water. At the same time, there is not sufficient $CO_2$ in the ice to give an undue ebullition of $CO_2$ gas as would be the case when using substantially greater proportions than 10% of $CO_2$.

Example I

Grind together 10% of solid carbon dioxide with 90% ice by weight to give a composite super-cooled cracked ice or snow. During the grinding period a portion—as much or more than 5% of $CO_2$—may be lost in the heat exchange in super-cooling the ice and in the heat of grinding so that the super-cooled ice product may contain less than 10% of solid $CO_2$ and, as stated above, for most purposes 5% of $CO_2$ is adequate.

The super-cooled cracked ice or snow product may be used as such or compressed into cakes, cubes, balls, "boulettes," or pillows, large blocks or any other desirable shape or size depending on the use for which they are intended herein included under the term "briquets."

Example II

Add solid or liquid $CO_2$ to water in proportions to freeze the water, cool to sub-freezing temperatures and allow a few per cent of $CO_2$ to remain. Here, again, 10% of solid or liquid $CO_2$ will suffice. When using this method, the product may be formed into porous lumps of any desired shape which may be, of course, further compacted or cracked as desired.

Example III

Dissolve carbon dioxide gas in water under super-atmospheric pressure and in the presence of an excess of 1 to 3% of the gas. The system is then super-cooled by any refrigerating means until the water and at least part of the $CO_2$ is frozen. The product formed in this manner may be a clear and transparent product if desired, but it may be further ground, cracked or used in any manner.

Example IV

A snow is formed by grinding ordinary ice with solid $CO_2$ in the proportion of 5% of solid $CO_2$ to 95% of ice, as in Example I.

Example V

Carbon dioxide snow is mixed in the proportions of 10% carbon dioxide with 90% of ordinary snow or cracked ice. A super-cooled granular snow or cracked ice is obtained containing less than 10% of $CO_2$.

Example VI

Ice as formed in Examples I to V is added to various beverages which may or may not already contain $CO_2$, such as orange juice, colas, beer, wine or champagne, lemonade, fruit punch, etc. etc.

Examples VII

A block of ice formed by any of the examples above, is placed in an ice refrigerator and found to maintain foods in a cold condition for a substantial period.

Example VIII

Ice cream, fresh vegetables, fish and meats packed in snow or cracked ice of Examples I to V are found to be well frozen for a longer period than when packed in ordinary ice and are not as hard as when refrigerated with only solid carbon dioxide.

Example IX

To a finely ground mixture of water ice and 10% of solid $CO_2$ is added several drops of water to cause the cluster into rough large lumps, each drop of water forming nucleus which immediately freezes binding all of the ground ice associated therewith into a lump, large or small depending upon the quantity of water added.

Example X

The ices formed in Examples 1 to 5 are treated by addition thereto of comestible flavoring, the whole mass agglomerating and freezing to form a comestible ice of various flavors. Such flavors as sweet syrups of fruit or chocolate may be used.

As used herein, the term "ice" refers to frozen water. Solid $CO_2$ or Dry Ice is frozen carbon dioxide gas.

Various modifications will occur to those skilled in the art, the examples given above being for purposes of clarification and not intended to be limiting except as defined in the claims.

I claim:

1. Method of forming a solid refrigerant comprising homogeneously mixing with attrition a major portion of water ice and a minor proportion of solid $CO_2$.

2. Method of forming a solid refrigerant comprising grinding a major proportion of solid water ice with a minor proportion of solid $CO_2$.

3. Method of forming a solid refrigerant comprising grinding solid water ice with a smaller proportion, about 0.1 to 10 per cent thereof, of solid $CO_2$.

4. Method as defined in claim 2 wherein the resulting refrigerant is formed into briquets.

5. A solid refrigerant composition consisting essentially of a solid water ice in major proportion in substantially homogeneous mixture with solid $CO_2$ in minor proportion, the homogeneous character of the composition being that produced by mixing with attrition a major proportion of water ice with such minor proportion of solid $CO_2$ ice that the bulk of the refrigeration effect of the solid $CO_2$ is transferred to the water ice and thereby caused to be exerted in the mixture at a temperature above the normal vaporizing temperature of substantially pure solid $CO_2$.

SOL B. WICZER.

REFERENCES CITED

The following references are of record in the file of this patent:

UNITED STATES PATENTS

| Number | Name | Date |
|---|---|---|
| 1,757,383 | Pankney | May 6, 1930 |
| 1,927,175 | Josephson | Sept. 19, 1933 |
| 2,014,245 | Donahoe | Sept. 10, 1935 |